(12) United States Patent
Yanagita (10) Patent No.: US 9,907,011 B2
(45) Date of Patent: Feb. 27, 2018

(54) NON-TRANSITORY COMPUTER READABLE MEDIUM, INFORMATION PROCESSING APPARATUS, AND NETWORK SYSTEM FOR DETERMINING RELAY UNIT BASED ON LOADING INFORMATION AND USEABLE-AREA OF USER

(71) Applicant: FUJI XEROX CO., LTD., Tokyo (JP)

(72) Inventor: Hiroshi Yanagita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 130 days.

(21) Appl. No.: 14/666,390

(22) Filed: Mar. 24, 2015

(65) Prior Publication Data

US 2015/0350999 A1  Dec. 3, 2015

(30) Foreign Application Priority Data

May 29, 2014  (JP) .................................. 2014-111372

(51) Int. Cl.
*H04W 40/22* (2009.01)
*H04B 7/155* (2006.01)
*H04W 40/20* (2009.01)

(52) U.S. Cl.
CPC ............ *H04W 40/22* (2013.01); *H04B 7/155* (2013.01); *H04B 7/15521* (2013.01); *H04W 40/20* (2013.01)

(58) Field of Classification Search
CPC .............................. H04W 40/20; H04W 40/22
See application file for complete search history.

(56) References Cited

U.S. PATENT DOCUMENTS

| 2013/0322238 | A1* | 12/2013 | Sirotkin | ............ H04W 28/0247 370/230 |
| 2015/0103738 | A1* | 4/2015 | Venkatraman | ........ H04W 48/20 370/328 |

FOREIGN PATENT DOCUMENTS

| JP | 2009-206837 A | 9/2009 |
| JP | 2011-119988 A | 6/2011 |

* cited by examiner

*Primary Examiner* — Feben M Haile
(74) *Attorney, Agent, or Firm* — Sughrue Mion, PLLC (57) ABSTRACT

A non-transitory computer readable medium stores a program causing a computer to execute a process. The process includes acquiring load information indicating load applied to each of multiple relay units which are included in a network system and which connect a terminal apparatus to the network system; determining, in response to a connection request being sent, a first relay unit with lower load than a second relay unit to which the connection request is sent by the terminal apparatus, based on the acquired load information; and providing information on the determined first relay unit to the terminal apparatus.

9 Claims, 9 Drawing Sheets

| FACILITY ID | FACILITY ID | DISTANCE (m) |
|---|---|---|
| F1 | F2 | 5 |
| F1 | F3 | 20 |
| . . | | |
| F1 | Fn | 35 |
| F2 | F3 | 45 |
| . . | | |
| Fn-1 | Fn | 10 |

FIG. 6

| ACCESS-POINT ID | FACILITY ID |
|---|---|
| AP1 | F1 |
| . . . | |

FIG. 7

| ACCESS-POINT ID | PACKET LOSS RATE (%) |
|---|---|
| AP1 | 8 |
| AP2 | 10 |
| . . . | |

| FACILITY ID | FACILITY POSITIONAL INFORMATION | MAP INFORMATION | USER ID |
|---|---|---|---|
| F1 | EAST WING, 10F, S001 AREA | | u001, u003, ... |
| ⋮ | | | |

| FACILITY ID | USAGE RATE (%) |
|---|---|
| F1 | 80 |
| . | |
| . | |
| . | |

NON-TRANSITORY COMPUTER READABLE MEDIUM, INFORMATION PROCESSING APPARATUS, AND NETWORK SYSTEM FOR DETERMINING RELAY UNIT BASED ON LOADING INFORMATION AND USEABLE-AREA OF USER

CROSS-REFERENCE TO RELATED APPLICATIONS

This application is based on and claims priority under 35 USC 119 from Japanese Patent Application No. 2014-111372 filed May 29, 2014.

BACKGROUND

Technical Field

The present invention relates to non-transitory computer readable media, information processing apparatuses, and network systems.

Summary

According to an aspect of the invention, there is provided a non-transitory computer readable medium storing a program causing a computer to execute a process. The process includes acquiring load information indicating load applied to each of multiple relay units which are included in a network system and which connect a terminal apparatus to the network system; determining, in response to a connection request being sent, a first relay unit with lower load than a second relay unit to which the connection request is sent by the terminal apparatus, based on the acquired load information; and providing information on the determined first relay unit to the terminal apparatus.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the drawings.

First Exemplary Embodiment

Figure 1:
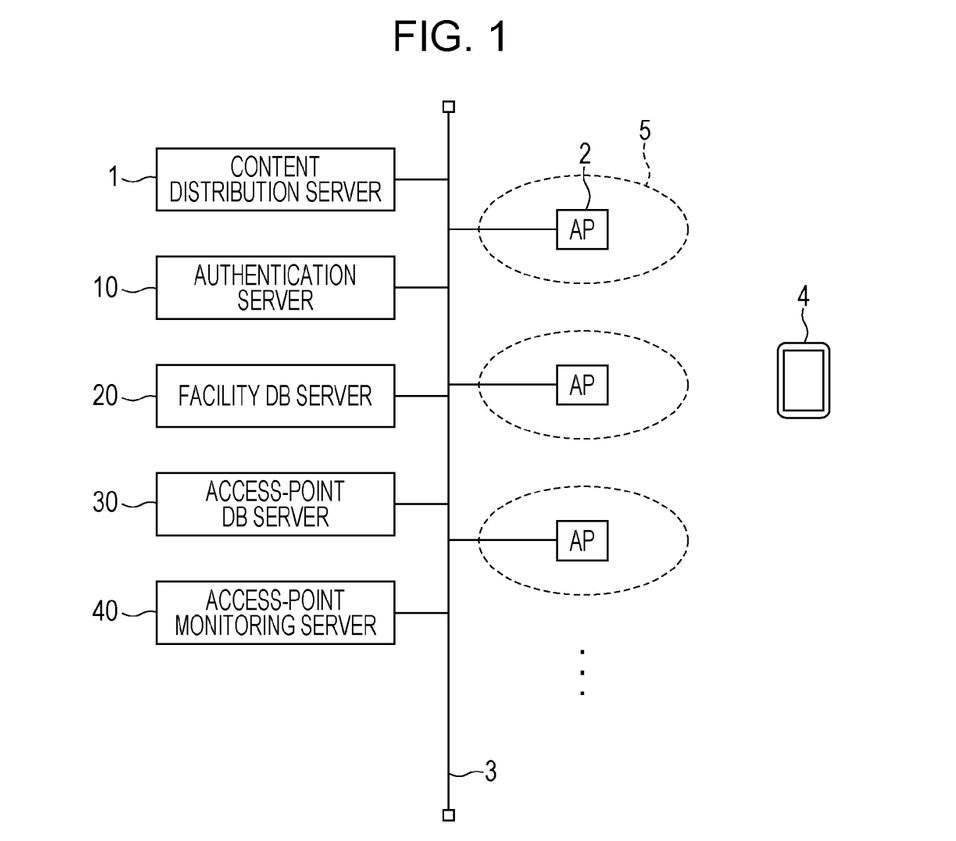
FIG. 1 illustrates the overall configuration of a service system, which is a network system according to an exemplary embodiment of the present invention.

FIG. 1 illustrates the overall configuration of a service system, which is a network system according to an exemplary embodiment of the present invention and which provides a service to an information terminal apparatus. The service system is configured within an establishment such as an office building. FIG. 1 illustrates a terminal 4 in addition to a configuration in which a content distribution server 1, an authentication server 10, a facility database (DB) server 20, an access-point database (DB) server 30, an access-point monitoring server 40, and access points (APs) 2 are connected to a local area network (LAN) 3.

The terminal 4 is an application-executable information terminal apparatus to be carried and used by a user within the establishment and may be a general-purpose wireless communication terminal, such as a tablet terminal, a mobile terminal, or a smartphone. The access points 2 are connectable relay units that are disposed in a scattered manner at predetermined positions within the establishment. Each access point 2 has a wireless LAN communication function for executing wireless communication with the terminal 4 and connects the wirelessly-LAN-connected terminal 4 to the LAN 3. An area where the terminal 4 is capable of using the service system by being connected to the LAN 3 via one of the access points 2 will be referred to as "facility" in the first exemplary embodiment. Examples of facilities include an office room, a meeting room, a cafeteria, and a hallway. Multiple access points 2 may be installed in a single facility, or a single access point 2 may be installed in multiple facilities so as to be wirelessly-LAN-connectable to the terminal 4. In other words, the access points 2 and facilities 5 may have a multipoint-to-multipoint relationship. However, in the first exemplary embodiment, each facility 5 has a single access point 2 installed therein for the sake of convenience. In other words, as shown in FIG. 1, the facilities 5 and the access points 2 have a one-to-one relationship. Thus, when an access point 2 is specified, the corresponding facility 5 is also specified, or when a facility 5 is specified, the corresponding access point 2 is also specified. Therefore, in the following description, the relationship between the facilities 5 and the access points 2 may be expressed as, for example, "an access point 2 installed in a facility 5".

Although the terminal 4 according to the first exemplary embodiment will be described below based on an assumption that the terminal 4 is wirelessly-LAN-connected to one of the access points 2 based on Wireless Fidelity (Wi-Fi), the terminal 4 may alternatively be connected to a relay unit by an alternative wireless communication function, such as Bluetooth (registered trademark). Furthermore, if hubs are installed as relay units, the terminal 4 may be equipped with a function for performing communication by being wired-connected to one of the hubs. In that case, identification information, such as an access-point ID in each access point 2, for uniquely distinguishing each relay unit is allocated to each relay unit.

The content distribution server 1 transmits content to the terminal 4 via one of the access points 2 so as to provide a desired service to the user who is carrying the terminal 4. The content distribution server 1 according to the first exemplary embodiment may be connected to the LAN 3 or to a network other than the LAN 3. The remaining servers 10 to 40 will be described below.

Figure 2:
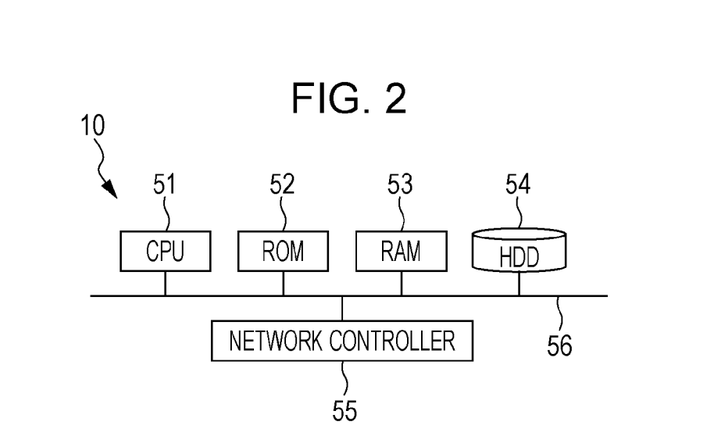
FIG. 2 illustrates a hardware configuration of a server computer that forms an authentication server according to a first exemplary embodiment.

FIG. 2 illustrates a hardware configuration of a server computer that forms the authentication server 10 according to the first exemplary embodiment. The server computer that forms the authentication server 10 according to the first exemplary embodiment may be achieved with an existing general-purpose hardware configuration. Specifically, as shown in FIG. 2, the computer is constituted by connecting a central processing unit (CPU) 51, a read-only memory (ROM) 52, a random access memory (RAM) 53, a hard disk drive (HDD) 54, and a network controller 55 provided as a communication unit to an internal bus 56. Where appropriate, a mouse and/or a keyboard may be provided as an input unit, a display may be provided as a display device, and an input-output controller that connects these components may be connected to the internal bus 56. Since the remaining servers 1, 20, 30, and 40 are also server computers, they may be configured as shown in FIG. 2.

Figure 3:
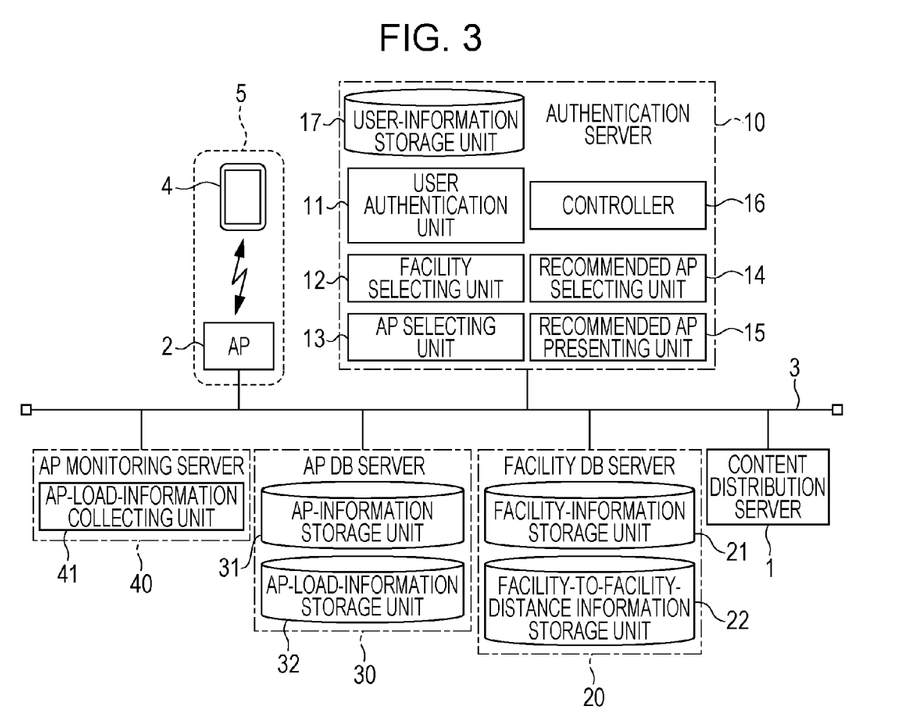
FIG. 3 is a block diagram of the service system according to the first exemplary embodiment.

FIG. 3 is a block diagram of the service system according to the first exemplary embodiment. In FIG. 3, components used for explaining the first exemplary embodiment are shown, whereas components not used for the explanation have been omitted.

The authentication server 10 is a server computer that performs authentication of the user using the service. When using the service, the user wirelessly-LAN-connects the terminal 4 to any one of the access points 2, requests log-in, and succeeds with user authentication so that the terminal 4 becomes connected to the LAN 3 via the wirelessly-LAN-connected access point 2. However, if there is an access point 2 via which the service is usable in a more comfortable environment than the access point 2 to which the terminal 4 is wirelessly-LAN-connected, the authentication server 10 is provided as an information processing apparatus that provides information related to that access point 2, namely, positional information of the facility 5 in which that access point 2 is installed, in the first exemplary embodiment. The term "comfortable environment" in this case refers to a working environment in which operation may be efficiently carried out (i.e., the service may be efficiently used) owing to the use of the system in a lower load environment.

The authentication server 10 includes a user authentication unit 11, a facility selecting unit 12, an access-point selecting unit 13, a recommended-access-point selecting unit 14, a recommended-access-point presenting unit 15, a controller 16, and a user-information storage unit 17. The user authentication unit 11 performs authentication of the user using the service system. The facility selecting unit 12 functions as a usable-area-information acquisition unit that acquires usable-area information indicating a facility or facilities usable by the user using the terminal 4 within the establishment provided with the service system. The access-point selecting unit 13 functions as a relay-unit information acquisition unit as well as a selecting unit. Specifically, the relay-unit information acquisition unit acquires relay-unit information (i.e., access-point information) indicating the correspondence relationship between each access point 2 and the area (i.e., the facility 5) where the access point 2 is usable. The selecting unit refers to the usable-area information and the relay-unit information and selects the access point or access points 2 corresponding to the area or areas (i.e., the facility or facilities 5) usable by the log-in-requested user from among the access points 2 included in the service system.

The recommended-access-point selecting unit 14 functions as a load-information acquisition unit (i.e., an acquisition unit), an area-to-area information acquisition unit, a travel-information acquisition unit, and a determining unit. Specifically, the load-information acquisition unit acquires load information indicating load applied to each of the multiple access points 2 included in the service system. The area-to-area information acquisition unit acquires area-to-area information (i.e., facility-distance-relationship information) indicating the positional relationship between the areas (i.e., the facilities 5) where the access points 2 are usable (i.e., the access points operates). Based on the area-to-area information, the travel-information acquisition unit acquires travel information (i.e., travel time) necessary for the user using the terminal 4 to travel from the facility where the user is currently located to each facility where the corresponding access point 2 to be evaluated is usable. When one of the access points 2 connection-requested from the terminal 4 connects the terminal 4 to the LAN 3, the determining unit evaluates each access point 2 by using the load information as an indicator so as to determine an access point 2 with lower load than the access point 2 connection-requested from the terminal 4.

The recommended-access-point presenting unit 15 functions as a providing unit that provides information related to the access point 2 determined by the recommended-access-point selecting unit 14 to the terminal 4. The controller 16 operates in cooperation with the components 11 to 15 included in the authentication server 10 so as to control the process of providing the recommended access point 2 to the terminal 4.

User information including a combination of user identification information (i.e., user ID) and a password is preregistered in the user-information storage unit 17.

The components 11 to 16 in the authentication server 10 are implemented by coordinative operation between the computer forming the authentication server 10 and a program executed by the CPU 51 equipped in the computer. The user-information storage unit 17 is implemented by the HDD 54 equipped in the authentication server 10. Alternatively, the RAM 53 or an external storage unit may be used via a network.

Figure 4:
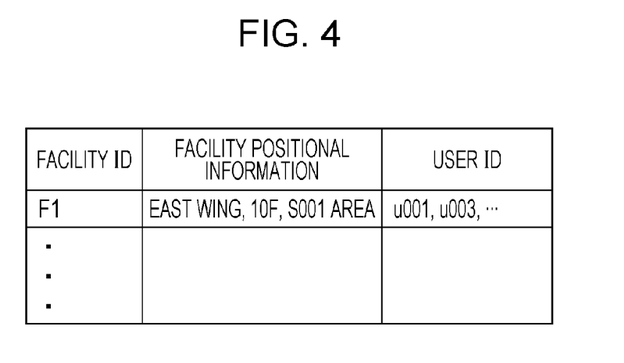
FIG. 4 illustrates a data configuration example of facility information stored in a facility-information storage unit according to the first exemplary embodiment.

The facility database server 20 stores and manages information related to the facilities 5. As the information related to the facilities 5, facility information and facility-to-facility distance information are used in the first exemplary embodiment. FIG. 4 illustrates a data configuration example of the facility information stored in a facility-information storage unit 21 of the facility database server 20 according to the first exemplary embodiment. In the facility information, identification information (i.e., facility ID) allocated to each facility 5 for identifying the facility 5 is preset in correspondence with facility positional information indicating the position of the facility 5 and also with the user ID or user IDs of a user or users permitted to use the facility 5. The expression "permitted to use" implies that entry into a facility 5 is permitted. The facility ID and the facility positional information correspond to the usable-area information for determining a facility usable by each user. Although the first exemplary embodiment relates to an example in which the use of each facility 5 is constantly permitted or not permitted, the usable time may be finely settable, such as setting the usable time to a certain day or days or to a certain time frame or time frames for each user.

Figure 5:
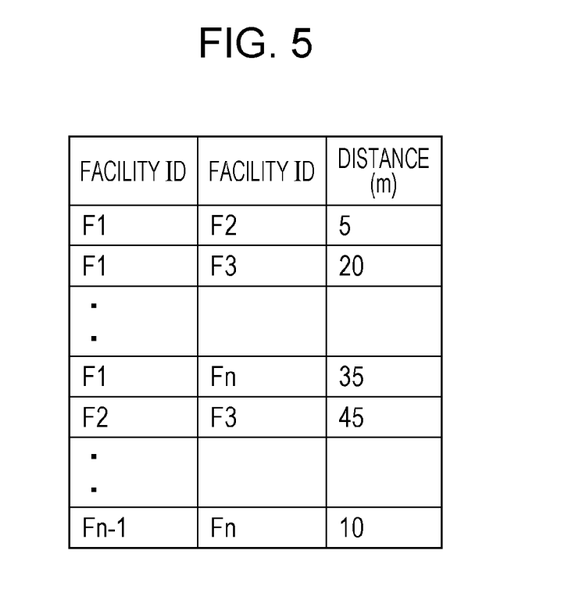
FIG. 5 illustrates a data configuration example of facility-to-facility distance information stored in a facility-to-facility-distance-information storage unit according to the first exemplary embodiment.

FIG. 5 illustrates a data configuration example of the facility-to-facility distance information stored in a facility-to-facility-distance-information storage unit 22 in the facility database server 20 according to the first exemplary embodiment. The facility-to-facility distance information corresponds to the area-to-area information described above. In the facility-to-facility distance information, the facility IDs of distance-set facilities 5 and the travel distance between the facilities 5 are preset.

Figure 6:
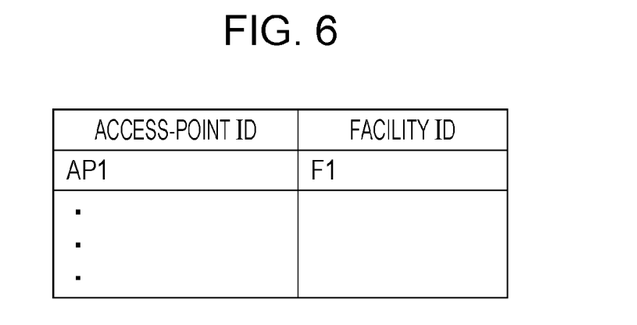
FIG. 6 illustrates a data configuration example of access-point information stored in an access-point-information storage unit according to the first exemplary embodiment.

The access-point database server 30 stores and manages information related to the access points 2. As the information related to the access points 2, access-point information and access-point load information are used in the first exemplary embodiment. FIG. 6 illustrates a data configuration example of the access-point information stored in an access-point-information storage unit 31 of the access-point database server 30 according to the first exemplary embodiment. In the access-point information, identification information (i.e., access-point ID) allocated to each access point 2 for identifying the access point 2 is preset in correspondence with the facility ID of the facility 5 in which the access point 2 is installed.

Figure 7:
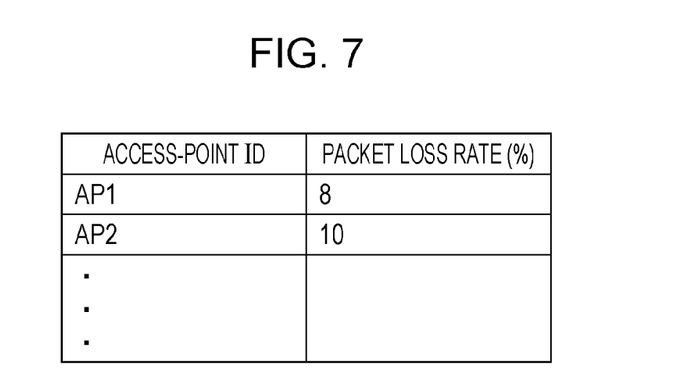
FIG. 7 illustrates a data configuration example of access-point load information stored in an access-point-load-information storage unit according to the first exemplary embodiment.

FIG. 7 illustrates a data configuration example of the access-point load information stored in an access-point-load-information storage unit 32 of the access-point database server 30 according to the first exemplary embodiment. The access-point load information corresponds to the load information described above. In the access-point load information, the access-point ID of each access point 2 is set in correspondence with a packet loss rate as indicator information indicating the load applied to the access point 2.

The access-point monitoring server 40 constantly monitors the load applied to each access point 2. The access-point monitoring server 40 has an access-point-load-information collecting unit 41 that periodically collects, from each access point 2, the packet loss rate as indicator information indicating the load applied to the access point 2, and sequentially updates the access-point-load-information storage unit 32 based on the collected packet loss rate. Although a packet loss rate is acquired as indicator information indicating the load in the first exemplary embodiment, an alternative indicator, such as an access-point-band usage rate, may be acquired so long as the indicator may serve as information indicating the load on each access point.

The access-point-load-information collecting unit 41 in the access-point monitoring server 40 is implemented by coordinative operation between a computer that forms the access-point monitoring server 40 and a program executed by a CPU equipped in the computer. Furthermore, the storage units 21, 22, 31, 32 in the facility database server 20 and the access-point database server 30 are implemented by HDDs equipped in the servers 20 and 30. Alternatively, a RAM or an external storage unit may be used via a network.

The packet loss rate stored in the access-point-load-information storage unit 32 is sequentially updated based on information collected by the access-point monitoring server 40. In contrast, the information set in each of the remaining storage units 17, 21, 22, and 31 is appropriately updated by, for example, an administrator in accordance with, for example, addition or deletion of a user, a facility 5, or an access point 2.

The program used in the first exemplary embodiment may be provided via a communication unit or may be provided by being stored in a computer readable storage medium, such as a compact disc read-only memory (CD-ROM) or digital versatile disc read-only memory (DVD-ROM). The program provided via the communication unit or from the storage medium is installed into a computer, and a CPU of the computer sequentially executes the program, so that various kinds of processing are achieved.

Although a user attempts to start using the service by wirelessly-LAN-connecting the terminal 4 to the access point 2 installed in the facility 5 where the user is currently located, if there is another access point 2 with lower load than the wirelessly-LAN-connected access point 2, the user may be able to use the service in a more comfortable environment by traveling to the facility 5 where that access point 2 is located and wirelessly-LAN-connecting the terminal 4 to that access point 2. In the first exemplary embodiment, recommended-access-point-related information that recommends an access point 2 with lower load than the currently-connected access point 2 is presented to the user.

Next, the operation according to the first exemplary embodiment will be described. In the first exemplary embodiment, the packet loss rate measured by and stored in each access point 2 is collected periodically, for example, every five minutes, by the access-point monitoring server 40. The access-point monitoring server 40 then transmits the collected packet loss rate to the access-point database server 30 so as to sequentially update the access-point-load-information storage unit 32. Although the access points 2 from which the packet loss rates are to be collected are all access points 2 included in the service system, the access-point-load-information collecting unit 41 may alternatively refer to the access-point-information storage unit 31 so as to determine access points 2 from which the packet loss rates are to be collected.

Figure 8:
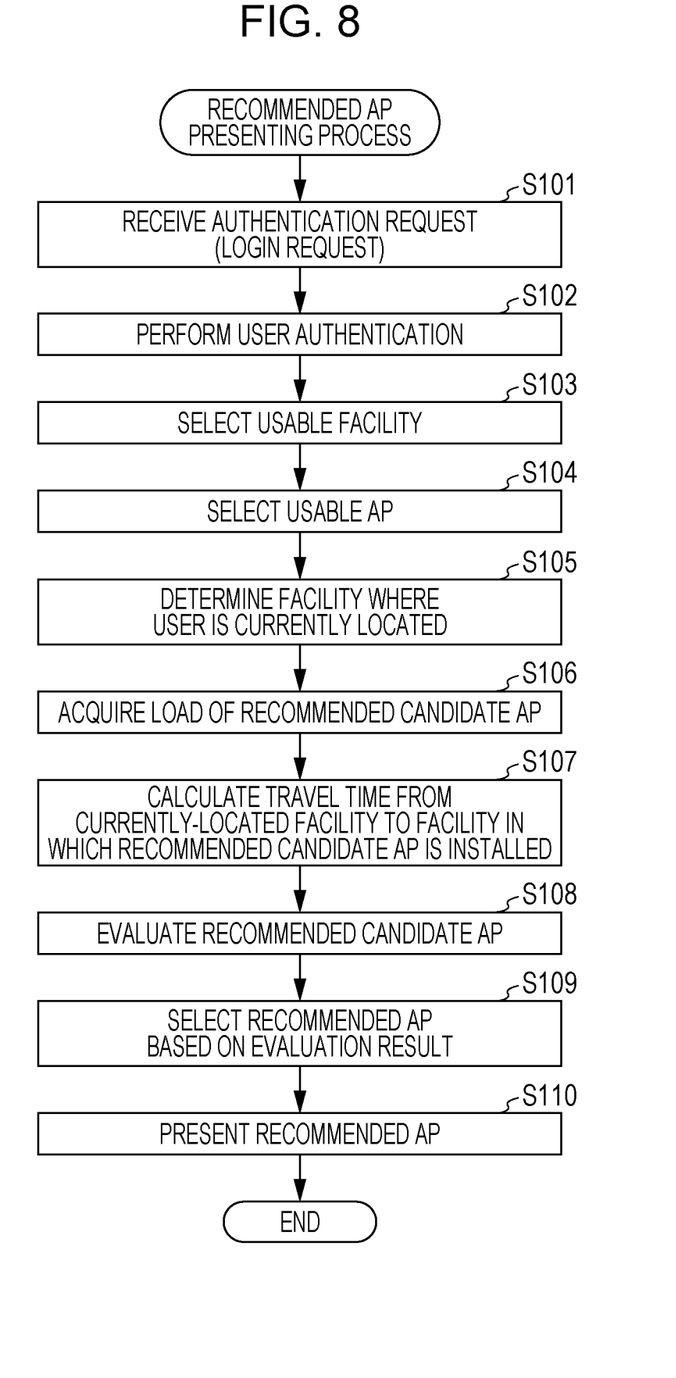
FIG. 8 is a flowchart illustrating a recommended-access-point presenting process according to the first exemplary embodiment.

Next, a recommended-access-point presenting process performed by the authentication server 10 according to the first exemplary embodiment will be described with reference to a flowchart shown in FIG. 8.

When the service provided by the content distribution server 1 is to be used, the user performs predetermined operation so as to cause the terminal 4 carried by the user to display a log-in screen. When the user inputs his/her user ID and password into the displayed log-in screen and subsequently performs predetermined operation, such as selects an OK button, the terminal 4 transmits log-in information including the user ID and the password to a connected access point 2 so as to request for log-in. It is assumed that the user knows the password for the access point 2 installed in correspondence with the facility 5 where the user is currently located, and that the terminal 4 is connected to the access point 2.

When the access point 2 connected to the terminal 4 receives the log-in request transmitted from the terminal 4, the access point 2 transmits, to the authentication server 10, authentication information generated by adding the access-point ID of the access point 2 to the transmitted log-in information, so as to request for user authentication. The log-in request from the terminal 4 or the authentication request made to the authentication server 10 by the access point 2 in accordance with this log-in request corresponds to a connection request made to the LAN 3 from the terminal 4.

In step S101, the user authentication unit 11 in the authentication server 10 receives the authentication request by receiving the authentication information transmitted from the access point 2. In step S102, the user authentication unit 11 performs user authentication by checking the user ID and the password included in the received authentication information against the user information registered in the user-information storage unit 17. If the user authentication is unsuccessful, a message indicating that the user authentication is unsuccessful is transmitted to the terminal 4, which has made the log-in request, via the access point 2 acting as the user authentication request source. In this case, however, the process will be described assuming that the user authentication is successful.

When the user authentication succeeds, the facility selecting unit 12 in the authentication server 10 selects a facility or facilities 5 usable by the user by sending an inquiry to the facility database server 20 in step S103. More specifically, the facility selecting unit 12 transmits inquiry information including the user ID included in the authentication information to the facility database server 20. In response to this inquiry, the facility database server 20 reads facility information including the facility ID or IDs and the facility positional information set in correspondence with the user ID from the facility-information storage unit 21 and transmits the facility information to the facility selecting unit 12. Accordingly, the facility selecting unit 12 selects a facility or facilities 5 usable by the user from among the facilities within the establishment.

In step S104, the access-point selecting unit 13 selects an access point or access points 2 usable by the user by sending an inquiry to the access-point database server 30. More specifically, the access-point selecting unit 13 transmits inquiry information including one or multiple facility IDs selected by the facility selecting unit 12 to the access-point database server 30. In response to this inquiry, the access-point database server 30 reads access-point information including the access-point ID or IDs set in correspondence with the facility ID or IDs from the access-point-information storage unit 31 and transmits the access-point information to the access-point selecting unit 13. Accordingly, among the multiple access points 2 included in the service system, the access-point selecting unit 13 excludes access points 2 installed in facilities 5 that are not permitted to be used by the user and selects only an access point or access points 2 usable by the user.

Accordingly, the selected one or more access points 2 become candidate access points 2 recommended to the user. The one or more access points 2 selected as candidate access points 2 recommended to the user (referred to as "recommended access points" hereinafter) will be referred to as "recommended candidate access points" hereinafter.

When the one or more recommended candidate access points are selected, the recommended-access-point selecting unit 14 determines the facility 5 where the user is currently located in step S105. Specifically, this facility 5 is determined based on the access-point ID included in the authentication information and the facility information selected by the access-point selecting unit 13.

In step S106, the recommended-access-point selecting unit 14 acquires the load applied to the one or more recommended candidate access points. More specifically, the recommended-access-point selecting unit 14 transmits inquiry information including the access-point ID or IDs of the one or more recommended candidate access points to the access-point database server 30. In response to this inquiry, the access-point database server 30 reads the packet loss rate or rates in the one or more recommended candidate access points 2 from the access-point-load-information storage unit 32 and transmits the packet loss rate or rates to the recommended-access-point selecting unit 14. Accordingly, the recommended-access-point selecting unit 14 acquires the load applied to the one or more recommended candidate access points.

In step S107, the recommended-access-point selecting unit 14 calculates the travel time it takes to travel from the current position (i.e., the facility where the user is currently located) to each facility in which a recommended candidate access point 2 is installed. More specifically, the recommended-access-point selecting unit 14 transmits, to the facility database server 20, inquiry information including a combination of the facility ID of the facility 5 where the user is currently located and the facility ID of each facility in which a recommended candidate access point is installed. In response to this inquiry, the facility database server 20 reads the distance of the combination of facility IDs from the facility-to-facility-distance-information storage unit 22 and transmits this distance to the recommended-access-point selecting unit 14. Accordingly, the recommended-access-point selecting unit 14 acquires the distance between the current position and each facility 5 in which a recommended candidate access point is installed as a facility-to-facility travel distance.

Based on this acquired facility-to-facility travel distance, the recommended-access-point selecting unit 14 calculates a travel time as travel information. Because a travel time is normally proportional to a travel distance, the travel time may be calculated by multiplying the travel distance by a fixed coefficient. Alternatively, the travel time may be calculated by multiplying the travel distance by a coefficient set in view of the positional relationship with the destination facility or a travel unit, such as the dimensions of the establishment, the floor relationship between facilities (e.g., the same floor or different floors), the existence or absence of an elevator, or the number of elevators. Moreover, for example, temporal characteristics, such as the days of the week, arrival and departure times, or lunch period, may be taken into account.

When the packet loss rate of each recommended candidate access point and the travel time to each facility in which a recommended candidate access point is installed are acquired, the recommended-access-point selecting unit 14 evaluates each recommended candidate access point in step S108. Specifically, an evaluation value is calculated. In the first exemplary embodiment, the evaluation value is calculated as follows.

Specifically, the recommended-access-point selecting unit 14 calculates the evaluation value by using a calculation expression $E=aT+bL$. In this case, T denotes a travel time, L denotes a packet loss rate, and a and b denote weighting coefficients. The weighting coefficients a and b may be set to appropriate values in accordance with the establishment in which the service system is installed. In the first exemplary embodiment, since an access point 2 with low load is provided, it is not desirable to set the weighting coefficient b to 0 or to an extremely small value (i.e., a negligible value)

relative to the weighting coefficient a. The weighting coefficient a may be set to a small value if the travel time is not of great importance, such as if the establishment is small or has only one floor. If the travel time is non-negligible and is a factor that should be taken into account, such as if the establishment is a high-rise building, the travel time may be set to a value larger than when the travel time is a negligible factor.

Accordingly, when the evaluation value is calculated for each recommended candidate access point, the recommended-access-point selecting unit 14 selects a recommended candidate access point whose evaluation value is smaller than that of the access point currently connected to the terminal 4. With regard to the travel time and the packet loss rate used as indicators in the first exemplary embodiment, the larger the value, the more difficult it is to travel. Moreover, the smaller the evaluation value, the better since the load is high. In the first exemplary embodiment, a recommended candidate access point with the minimum evaluation value is selected as a recommended access point. Alternatively, multiple recommended candidate access points with the smaller evaluation values may be selected as recommended access points.

When the recommended access point is selected, the recommended-access-point presenting unit 15 generates information including the facility positional information of the facility (also referred to as "recommended facility" hereinafter) corresponding to the access point 2 selected as the recommended access point from the facility positional information acquired in step S105. The recommended-access-point presenting unit 15 transmits this generated information as recommendation information to the access point 2 connected to the terminal 4 so as to present the information to the user carrying the terminal 4.

Figure 9:
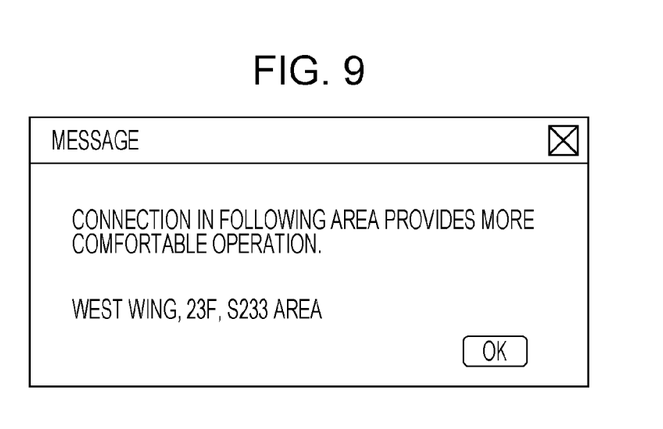
FIG. 9 illustrates a screen display example of recommendation information displayed on a terminal according to the first exemplary embodiment.

Accordingly, when the terminal 4 receives the recommendation information transmitted from the access point 2 together with the message indicating that the authentication is successful in response to the log-in request, the terminal 4 displays the recommendation information on a screen thereof by executing a predetermined application. FIG. 9 illustrates a display example of this screen.

If the user desires to use the provided service comfortably, the user may refer to the recommendation information displayed on the terminal 4 and travel to the displayed facility. In the case of the first exemplary embodiment, since the recommended facility is selected from among facilities usable by the user, a state where the user is not able to enter the recommended facility does not occur. Although an access-point ID may be displayed as the information related to the access point 2, the user may not always be able to determine the position of the facility from the access-point ID. Therefore, in the first exemplary embodiment, the positional information of the facility in which the recommended access point is installed is presented as the recommendation information.

Furthermore, in a case where an access point 2 whose load is simply lower than that of the currently-connected access point 2 is recommended, if it takes a large amount of time to travel to the recommended facility, it is difficult to say that the recommended access point is suitable for the user. In the first exemplary embodiment, an access point (i.e., facility) is recommended in view of the load on the user for traveling between facilities.

Second Exemplary Embodiment

Figure 10:
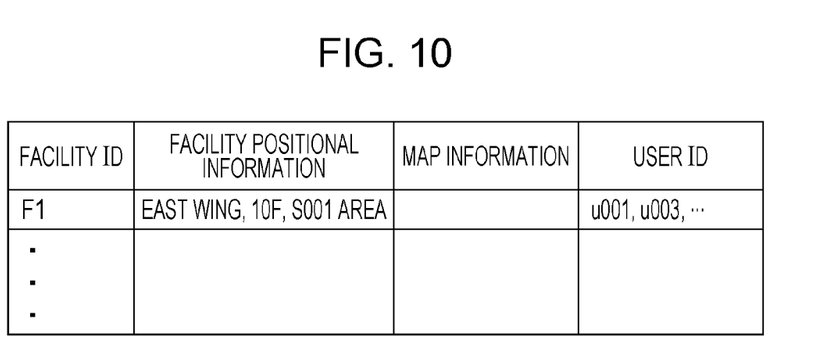
FIG. 10 illustrates a data configuration example of facility information stored in a facility-information storage unit according to a second exemplary embodiment.

FIG. 10 illustrates a data configuration example of facility information stored in the facility-information storage unit 21 of the facility database server 20 according to the second exemplary embodiment. In the facility information according to the second exemplary embodiment, each facility ID has added thereto the facility positional information and the user ID similar to the first exemplary embodiment and is preset in correspondence with map information. The map information visually shows the area where the facility is located within the establishment. In the second exemplary embodiment, the map information used shows the layout of the floor on which the facility is located. In the second exemplary embodiment, map image data (i.e. a map image) is set as item data of the map information. Alternatively, storage-destination information indicating the storage destination of the map image may be set, and the map image itself may be stored in a separate location. In the second exemplary embodiment, the facility information and facility-usage-status information are stored in a separate storage unit according to the intended usage, but may be formed in an integrated fashion. Since the remaining configuration may be the same as the first exemplary embodiment, a description thereof will be omitted.

In the first exemplary embodiment, the position of a facility (i.e., a recommended facility) where operation may be comfortably carried out is presented by using text information, as shown in FIG. 9. In the second exemplary embodiment, the recommendation information further includes the map information so that the position of the recommended facility is visually recognizable.

Figure 11:
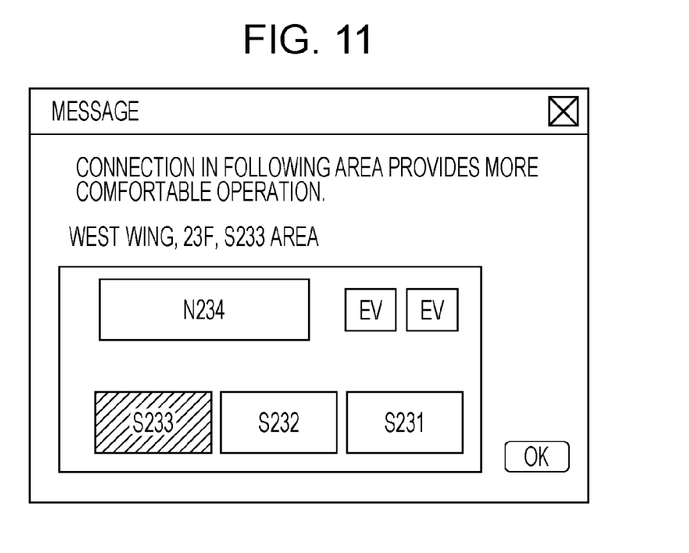
FIG. 11 illustrates a screen display example of recommendation information displayed on a terminal according to the second exemplary embodiment.

Specifically, when a recommended access point is selected, the recommended-access-point presenting unit 15 according to the second exemplary embodiment acquires, from the facility database server 20, the map information together with the facility positional information of the recommended facility, and generates information including the acquired facility positional information and the acquired map information.

FIG. 11 illustrates a screen display example of the recommendation information displayed on the terminal 4 having received the information generated in the above-described manner.

As compared with the screen display example (FIG. 9) in the first exemplary embodiment, it is apparent that the map information of the recommended facility is displayed together with the positional information (i.e., character string information) in the second exemplary embodiment. If the user desires to use the provided service in a comfortable environment, the user may refer to the recommendation information displayed on the terminal 4, travel down to the 23rd floor by using an elevator in the west wing, and readily find an S233 area.

Third Exemplary Embodiment

For example, it is assumed that a facility is a living space and seats for carrying out operation are set in that facility. The term "operation" in this case includes not only operation using the terminal 4 for connecting to the LAN 3 for using the service, but also operation using the terminal 4 but not necessarily for connecting to the LAN 3, as well as operation not using the terminal 4. Specifically, the term "operation" is not particularly limited in terms of the contents of operation. However, it is assumed that the user using the facility performs operation by sitting down in a seat. In this case, even when a facility that provides a more comfortable environment than the current one is recommended, if the seats in the recommended facility are fully occupied, the user may not be able to perform operation even if the user travels to that recommended facility. In the third exemplary embodiment, a recommended access point is selected in view of the usage status of a facility.

Figure 12:
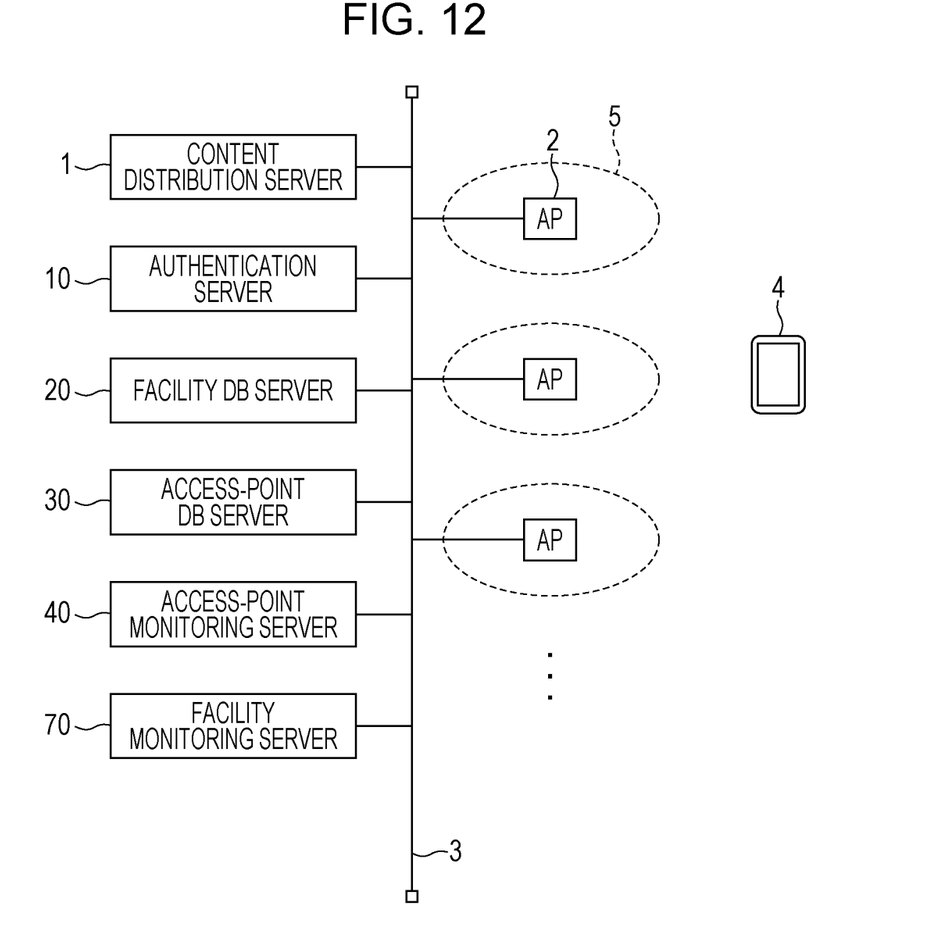
FIG. 12 illustrates the overall configuration of a service system according to a third exemplary embodiment.
Figure 13:
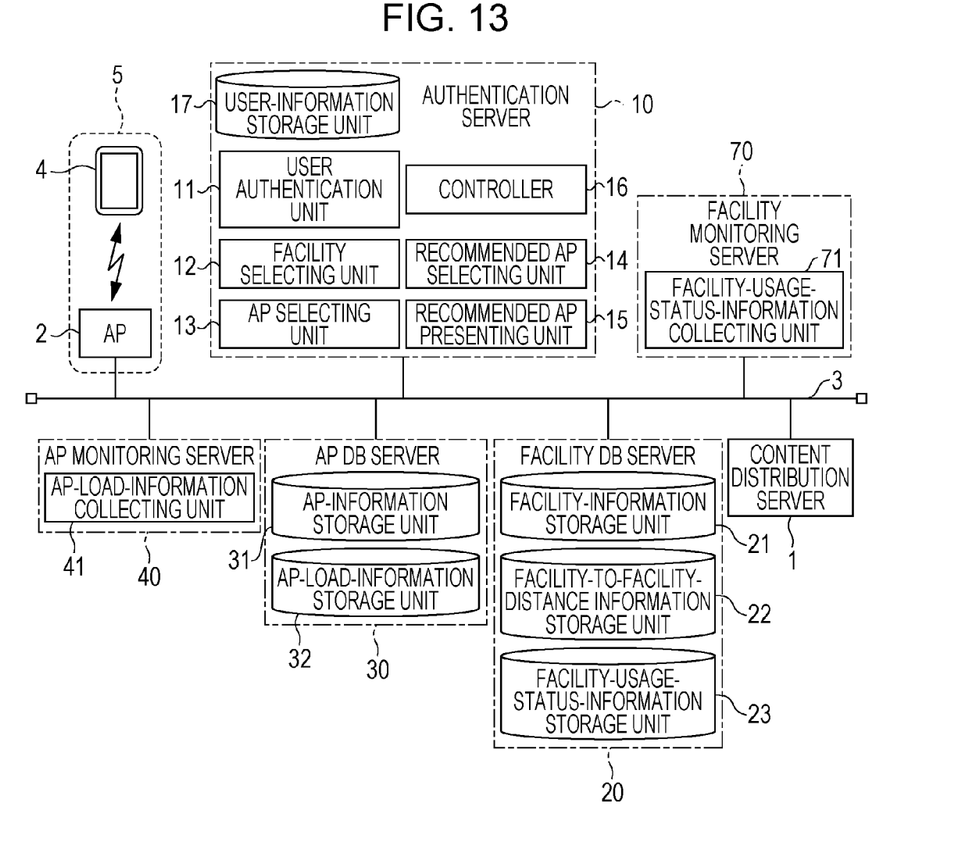
FIG. 13 is a block diagram of a service system according to the third exemplary embodiment.

FIG. 12 illustrates the overall configuration of a service system according to the third exemplary embodiment. FIG. 13 is a block diagram of the service system according to the third exemplary embodiment. FIGS. 12 and 13 respectively correspond to FIGS. 1 and 3 in the first exemplary embodiment. Identical components will be given the same reference characters, and descriptions thereof will be omitted. In the service system according to the third exemplary embodiment, a facility monitoring server 70 has been added to the configuration in the first exemplary embodiment, and a facility-usage-status-information storage unit 23 has been added to the facility database server 20.

The facility monitoring server 70 has a facility-usage-status-information collecting unit 71 that periodically collects usage-status information indicating the usage status of each facility, and transmits the usage-status information collected by the facility-usage-status-information collecting unit 71 to the facility database server 20 so as to make the facility-usage-status-information storage unit 23 store the usage-status information.

Figure 14:
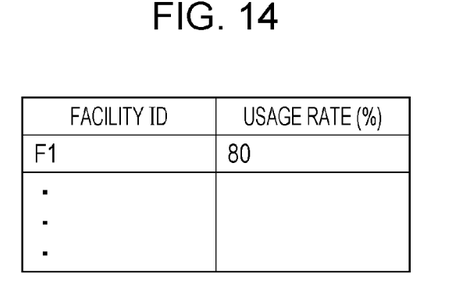
FIG. 14 illustrates a data configuration example of facility-usage-status information stored in a facility-usage-status-information storage unit according to the third exemplary embodiment.

FIG. 14 illustrates a data configuration example of the facility-usage-status information stored in the facility-usage-status-information storage unit 23 of the facility database server 20 according to the third exemplary embodiment. In the facility-usage-status information, the facility ID of each facility 5 is set in correspondence with a usage rate of the facility 5 as usage-status information.

The facility-usage-status-information collecting unit 71 is implemented by coordinative operation between a computer that forms the facility monitoring server 70 and a program executed by a CPU equipped in the computer. Furthermore, the facility-usage-status-information storage unit 23 is implemented by an HDD equipped in the facility monitoring server 70. Alternatively, a RAM or an external storage unit may be used via a network.

With regard to the operation according to the third exemplary embodiment to be described below, since the operation only differs from that in the first exemplary embodiment in terms of the configuration and process related to the usage-status information, the descriptions regarding the configuration and process similar to those in the first exemplary embodiment will be omitted.

In the third exemplary embodiment, in order to constantly monitor the usage status in each facility, a human detector, such as a human sensor, is disposed in each facility. The facility-usage-status-information collecting unit 71 refers to sensor data from the human sensor so as to ascertain the number of people using the seats in the corresponding facility. Because the number of seats within each facility is known in advance, the usage rate of the facility is calculated by dividing the number of detected people by the number of seats. As an alternative to or in addition to the use of the human sensor, the number of people within each facility may be detected by, for example, making each user operate a switch provided at each seat when the user uses the seat, or acquiring the number of people present in each facility recognized by an entry-exit monitoring system if such an entry-exit monitoring system is incorporated. The facility-usage-status-information collecting unit 71 calculates the usage rate of each facility periodically, for example, every minute, in the above-described manner and transmits the calculated usage rate to the facility database server 20 so as to sequentially update the facility-usage-status-information storage unit 23.

Figure 15:
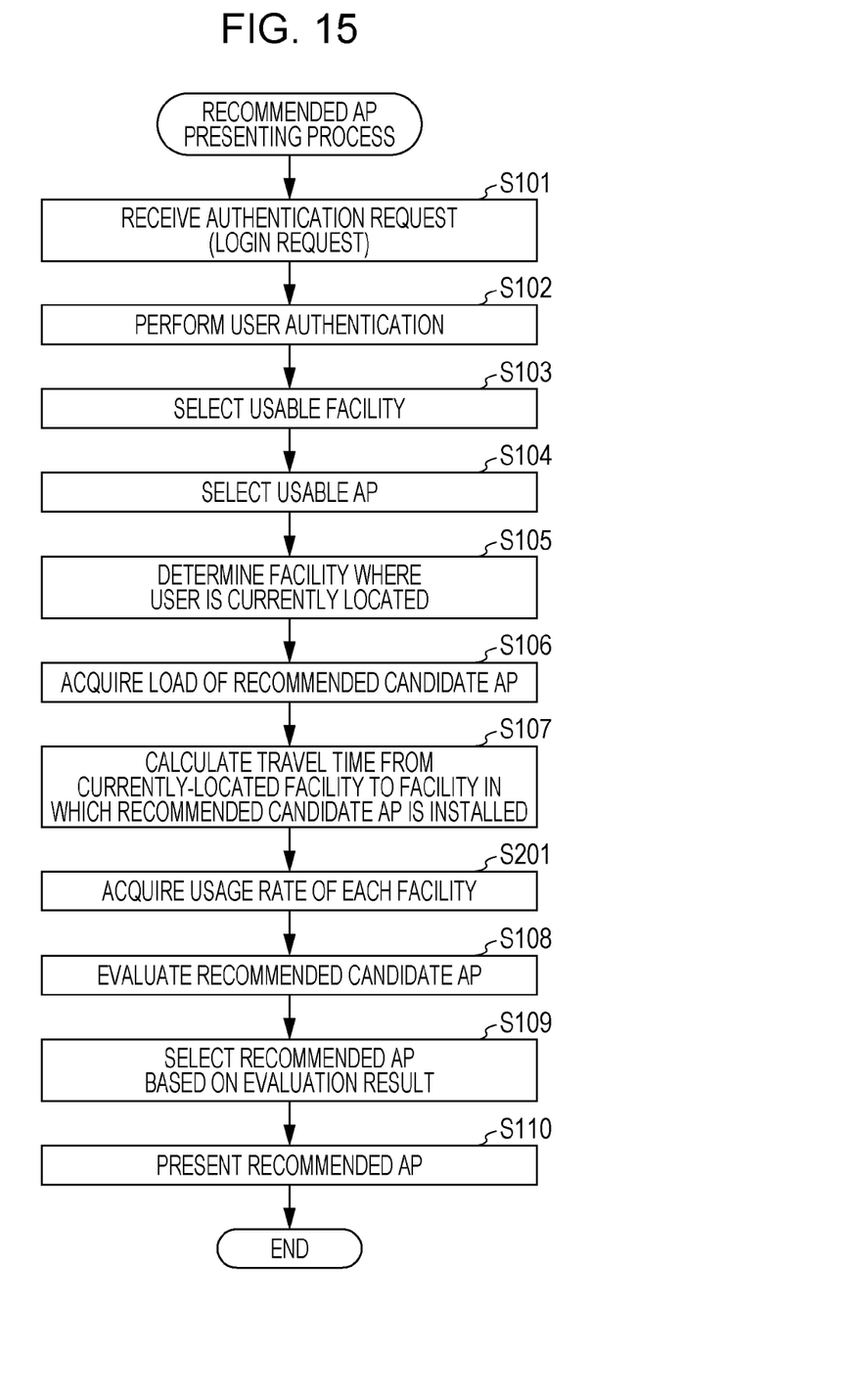
FIG. 15 is a flowchart illustrating a recommended-access-point presenting process according to the third exemplary embodiment.

Subsequently, a recommended-access-point presenting process performed by the authentication server 10 according to the third exemplary embodiment will be described with reference to a flowchart shown in FIG. 15. Because the recommended-access-point presenting process according to the third exemplary embodiment is only different from the above-described process in that facility-usage-status information is used by the recommended-access-point selecting unit 14 functioning as a usage-rate-information acquisition unit that acquires usage-status information indicating the usage status of each facility in which the corresponding access point 2 is usable, descriptions of other steps will be omitted.

In step S201, the recommended-access-point selecting unit 14 acquires the usage status of each facility (i.e., recommended candidate facility) in which a recommended candidate access point 2 is installed. More specifically, the recommended-access-point selecting unit 14 transmits inquiry information including the facility ID of each recommended candidate facility to the facility database server 20. In response to this inquiry, the facility database server 20 reads the usage rate of each recommended candidate facility inquired from the facility-usage-status-information storage unit 23 and transmits the usage rate to the recommended-access-point selecting unit 14. Accordingly, the recommended-access-point selecting unit 14 acquires the usage rate of each recommended candidate facility.

In step S108, when the recommended-access-point selecting unit 14 acquires a packet loss rate of each recommended candidate access point, a travel time to the corresponding recommended candidate facility, and the usage rate of the recommended candidate facility, the recommended-access-point selecting unit 14 evaluates each recommended candidate access point. Specifically, although an evaluation value is calculated in a manner similar to the first exemplary embodiment, the evaluation value in the third exemplary embodiment is calculated by using a calculation expression $E=aT+bL+cU$, in which the usage rate of the recommended candidate facility is added. In this case, c denotes a weighting coefficient, and U denotes a usage rate.

Accordingly, when the evaluation value is calculated for each recommended candidate access point, the recommended-access-point selecting unit 14 selects a recommended access point in step S109 in a manner similar to the first exemplary embodiment. Similar to the packet loss rate and the travel time, the facility usage rate becomes an undesired indicator for the user as the value thereof increases.

According to the third exemplary embodiment, since the recommended facility is presented in view of the facility usage rate, a problem where the facility is recommended but the facility is not usable after traveling to the facility may be reduced.

Fourth Exemplary Embodiment

Figure 16:
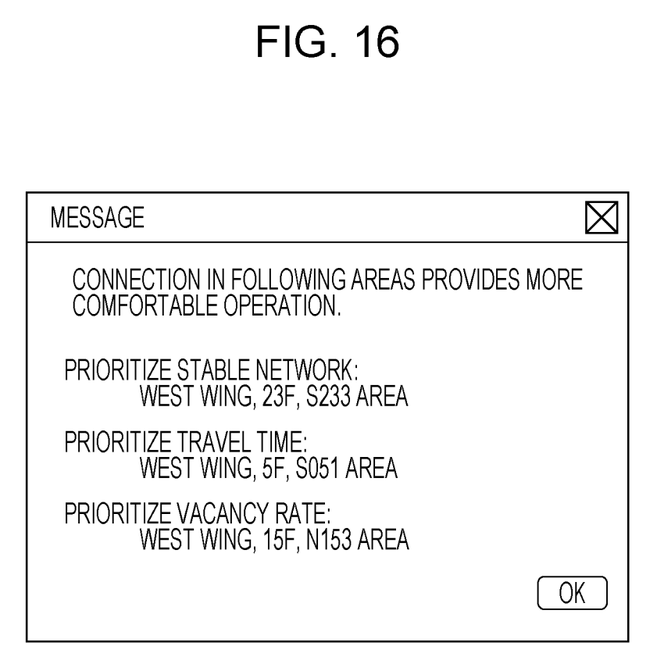
FIG. 16 illustrates a screen display example of recommendation information displayed on a terminal according to a fourth exemplary embodiment.

FIG. 16 illustrates a screen display example of recommendation information displayed on the terminal 4 according to a fourth exemplary embodiment. In the third exemplary embodiment described above, a recommended access point is selected by calculating a single evaluation value obtained by multiplying the indicators, which include the load (i.e., the packet loss rate) applied to the access point 2, the travel time to the corresponding facility, and the usage rate of the facility, by the respective coefficients. In the fourth exemplary embodiment, a facility with a high evaluation result is recommended for each indicator.

According to the display example in FIG. 16, for example, a user expecting high operation efficiency may travel to a facility in which an access point 2 with the lowest load among the access points 2 is installed, namely, "west wing, 23F, S223 area". Needless to say, it is assumed that the recommended access point (facility) has lower load than the current access point. A user who desires to travel easily rather than to focus on operation efficiency may travel to the nearest facility from the current position, namely, "west wing, 5F, S051 area". A user who desires to travel to a quiet environment with vacant seats ensured and with a fewer number of occupants may travel to a facility with a high vacancy rate, namely, "west wing, 15F, N153 area". A vacancy rate is calculated using the expression (1−usage rate).

Accordingly, a facility with a high evaluation result may be presented for each indicator. When presenting a facility for each indicator, such as when presenting a facility with the travel time set as a priority, not only is the nearest facility from the current position simply presented, but the load applied to the access point 2 should also be taken into account. In other words, the selection should be made from among recommended candidate access points with lower load than the currently-connected access point 2. Therefore, each indicator-prioritized facility may be selected by adjusting the values of the weighting coefficients a, b, and c to be multiplied by the corresponding indicator values when calculating an evaluation value E.

Although each of the exemplary embodiments described above relates to an example in which a network system is applied to a service system, the network system may be applied to an alternative system. Furthermore, the configurations and processes described in the above exemplary embodiments may be appropriately combined.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process, the process comprising:
    acquiring load information indicating load applied to each of a plurality of relay units which are located in an establishment provided with a network system, and which connect a terminal apparatus in the establishment to the network system;
    acquiring relay-unit information indicating correspondence between each of the plurality of relay units and an area where each of the plurality of relay units operates;
    acquiring usable-area information indicating which areas within the establishment a user of the terminal apparatus is allowed to enter;
    determining, in response to a connection request being sent, a first relay unit with lower load than a second relay unit to which the connection request is sent by the terminal apparatus, based on the acquired load information, the acquired relay-unit information and the acquired usable-area information, the first relay unit being determined from among relay units which operate in areas that the user of the terminal apparatus is allowed to enter; and
    providing information on the determined first relay unit to the terminal apparatus.

2. The non-transitory computer readable medium according to claim 1, the process further comprising:
    acquiring travel information related to traveling of the user of the terminal apparatus from a currently-located area to the area where each of the plurality of relay units operates,
    wherein determining the first relay unit is performed further based on the acquired travel information.

3. The non-transitory computer readable medium according to claim 1,
    wherein the provided information further indicates an area where the determined first relay unit operates.

4. The non-transitory computer readable medium according to claim 1, wherein
    the provided information includes map information indicating an area where the determined first relay unit operates.

5. The non-transitory computer readable medium according to claim 1, the process further comprising:
    acquiring usage-status information indicating a usage status of each area where each of the plurality of relay units operates,
    wherein determining the first relay unit is performed further based on the acquired usage-status information.

6. The non-transitory computer readable medium according to claim 1,
    wherein the usable-area information further indicates areas, among the areas that the user is allowed to enter, that are available for use.

7. The non-transitory computer readable medium according to claim 5,
    wherein the usage-status of each area indicates whether the area is currently being used.

8. An information processing apparatus comprising:
    at least one processor which implements:
        an acquisition unit configured to:
            acquire load information indicating load applied to each of a plurality of relay units which are located in an establishment provided with a network system, and which connect a terminal apparatus in the establishment to the network system,
            acquire relay-unit information indicating correspondence between each of the plurality of relay units and an area where each of the plurality of relay units operates, and
            acquire usable-area information indicating which areas within the establishment a user of the terminal apparatus is allowed to enter;
        a determining unit configured to determine, in response to a connection request being sent, a first relay unit with lower load than a second relay unit to which the connection request is sent by the terminal apparatus, based on the acquired load information, the acquired relay-unit information and the acquired usable-area information, the first relay unit being determined from among relay units which operate in areas that the user of the terminal apparatus is allowed to enter; and
        a providing unit configured to provide information on the determined first relay unit to the terminal apparatus.

9. A network system comprising:
    a network;
    a plurality of relay units that are connected to the network;
    a terminal apparatus that is connected to the network via any one of the relay units;
    at least one processor which implements:
        an acquisition unit configured to:
            acquire load information indicating load applied to each of the plurality of relay units which are located in an establishment provided with a network system, and which connect the terminal apparatus in the establishment to the network system, acquire relay-unit information indicating correspondence between each of the plurality of relay units and an area where each of the plurality of relay units operates, and acquire usable-area information indicating which areas within the establishment a user of the terminal apparatus is allowed to enter;

a determining unit configured to determine, in response to a connection request being sent, a first relay unit with lower load than a second relay unit to which the connection request is sent by the terminal apparatus, based on the acquired load information, the acquired relay-unit information and the acquired usable-area information, the first relay unit being determined from among relay units which operate in areas that the user of the terminal apparatus is allowed to enter; and a providing unit configured to provide information on the determined first relay unit to the terminal apparatus.

* * * * *